US008764989B2

(12) United States Patent
Minnix

(10) Patent No.: US 8,764,989 B2
(45) Date of Patent: *Jul. 1, 2014

(54) OZONE PURIFICATION SYSTEM FOR WATER

(76) Inventor: Charles M. Minnix, Greenwood, IN (US)

( * ) Notice: Subject to any disclaimer, the term of this patent is extended or adjusted under 35 U.S.C. 154(b) by 248 days.

This patent is subject to a terminal disclaimer.

(21) Appl. No.: 11/133,608

(22) Filed: May 20, 2005

(65) Prior Publication Data
US 2005/0236338 A1 Oct. 27, 2005

Related U.S. Application Data

(60) Division of application No. 10/628,961, filed on Jul. 29, 2003, now abandoned, which is a continuation-in-part of application No. 10/207,142, filed on Jul. 29, 2002, now abandoned.

(51) Int. Cl.
C02F 1/78 (2006.01)

(52) U.S. Cl.
USPC ........................................ 210/760; 366/163.2

(58) Field of Classification Search
USPC ...................... 210/760, 764, 192, 198.1, 205;
422/186.07; 261/DIG. 42, DIG. 56;
366/162.4, 163.2, 177.1, 181.6
See application file for complete search history.

(56) References Cited

U.S. PATENT DOCUMENTS 4,387,685 A * 6/1983 Abbey ........................... 123/439
4,573,803 A * 3/1986 Gritters et al. ............. 366/173.2
4,595,498 A 6/1986 Cohen et al.
4,619,763 A 10/1986 O'Brien
4,743,199 A 5/1988 Weber et al.
5,106,495 A 4/1992 Hughes
5,120,219 A 6/1992 DeFarcy
5,158,454 A 10/1992 Viebahn et al.
5,181,399 A 1/1993 Engel et al.

(Continued)

FOREIGN PATENT DOCUMENTS

| EP | 0 856 491 A2 | 8/1998 |
| EP | 1094037 | 4/2001 |
| WO | WO 00/23383 | 4/2000 |
| WO | WO 01/93793 | 12/2001 |

OTHER PUBLICATIONS

Partial International Search Report for International Application No. PCT/US03/23449 mailed on Dec. 3, 2003.

*Primary Examiner* — Frank M Lawrence
(74) *Attorney, Agent, or Firm* — Roberts IP Law; John Roberts

(57) ABSTRACT

An ozone purification system for fluids that includes a pump having an inlet for receiving the fluid. The pump includes at least one opening. An expansion tank is in communication with a first of the at least one opening of the pump, wherein the fluid may flow from the pump through the at least one opening to the expansion tank. The system includes an ozone generator having an ozone impregnator, which is in fluid communication with the expansion tank and is adapted to inject an amount of ozone into the fluid. A holding tank is in communication with the pump. A valve is in communication with the pump and includes a first and a second position. The valve directs the fluid to exit the system when valve is in the first position, and the valve recycles the fluid to the expansion tank when the is in the second position.

13 Claims, 9 Drawing Sheets

(56) References Cited

U.S. PATENT DOCUMENTS

| | | | |
|---|---|---|---|
| 5,241,720 A | 9/1993 | Engel et al. | |
| 5,266,215 A | 11/1993 | Engelhard | |
| 5,350,511 A * | 9/1994 | Sakurada | 210/199 |
| 5,368,815 A | 11/1994 | Kasting, Jr. et al. | |
| 5,474,749 A | 12/1995 | Takeda | |
| 5,493,743 A | 2/1996 | Schneider et al. | |
| 5,562,822 A * | 10/1996 | Furness et al. | 210/188 |
| 5,635,059 A | 6/1997 | Johnson | |
| 5,772,886 A | 6/1998 | Bettle | |
| 5,824,243 A | 10/1998 | Contreras | |
| 5,868,945 A | 2/1999 | Morrow et al. | |
| 5,942,125 A | 8/1999 | Engelhard et al. | |
| 5,993,753 A * | 11/1999 | Davidson | 422/275 |
| 6,013,227 A | 1/2000 | Lin et al. | |
| 6,015,529 A | 1/2000 | Lin et al. | |
| 6,076,808 A | 6/2000 | Porter | |
| 6,106,731 A | 8/2000 | Hayes | |
| 6,117,285 A | 9/2000 | Welch et al. | |
| 6,117,324 A * | 9/2000 | Greene et al. | 210/627 |
| 6,231,769 B1 | 5/2001 | Pean et al. | |
| 6,254,838 B1 | 7/2001 | Goede | |
| 6,267,895 B1 | 7/2001 | Engelhard et al. | |
| 6,428,710 B1 | 8/2002 | Kempen et al. | |
| 2002/0040867 A1 | 4/2002 | Conrad | |
| 2002/0185452 A1 * | 12/2002 | Johnson | 210/748 |
| 2003/0146140 A1 * | 8/2003 | Greene | 210/192 |

* cited by examiner

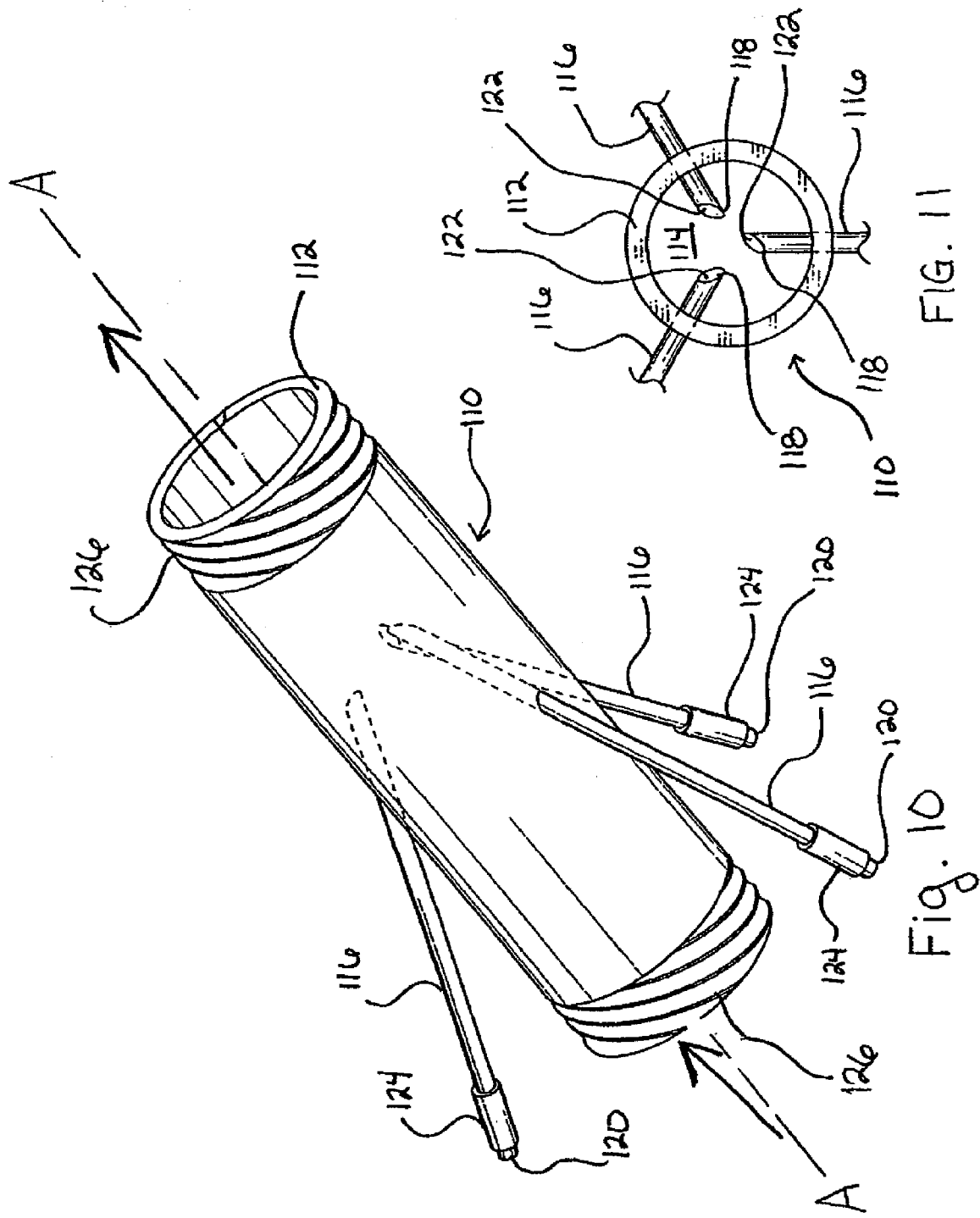

OZONE PURIFICATION SYSTEM FOR WATER

This application is a Divisional of, and claims the benefit of priority under 35 U.S.C. §121 to, U.S. application Ser. No. 10/628,961 filed on Jul. 29, 2003 in the name of Charles M. Minnix and now abandoned, which is a continuation-in-part of U.S. application Ser. No. 10/207,142, filed Jul. 29, 2002 in the name Charles M. Minnix and now abandoned.

BACKGROUND OF THE INVENTION

1. Field of Invention

The present invention relates to water treatment systems, specifically those systems that are used to sterilize and cleanse water.

2. Description of the Related Art

Water is a valuable resource that serves numerous different purposes. Perhaps the most well known use of water is as a beverage for human or animal consumption. In addition, water is essential for bathing and cleaning. Water is also used in beverage and food processing as an ingredient and/or as a cleaning agent for cleansing the ingredients and/or the processing equipment. Water also serves important purposes in medical facilities, pharmacies, and research laboratories. For instance, in medical facilities water is used to cleanse and/or sterilize wounds, burns, surgical equipment, and hospital supplies. In pharmacies, water is used to reconstitute dehydrated medication and prepare medicinal remedies. In research laboratories, water is used to cleanse supplies, prepare solutions, extract compounds, and wash products.

However, raw water often contains pathogens and other microbes that can cause adverse reactions in humans and animals. Consequently, raw water must be cleansed before it can safely serve these purposes. In the case of certain purposes, such as cleansing cuts, scrapes, burns, and the like, the water may also need to be sterilized. Furthermore, raw water typically contains minerals such as iron, which may stain surfaces, skin and hair, and calcium, which forms scale build-up on surfaces. Consequently, some uses require that the water be demineralized before use. Attempts have been made to cleanse water including adding various chemicals to the water to kill pathogens and/or filtering the water to remove pathogens. Unfortunately, these methods often do not cleanse the water to the degree necessary for some uses, such as medicinal and pharmaceutical purposes.

One known chemical method commonly used by municipal utilities includes adding large amounts of chlorine to the water. However, the chlorine may adversely affect the taste of the water, and may also combine with any organic matter present in the water to produce undesirable and potentially dangerous compounds. In addition, the chlorine may cause adverse reactions in people who are sensitive to chemical chlorine. Furthermore, even after chlorination, the water still may still contain a level of microbes that, although deemed safe, may still cause adverse reactions in some people. As a result, some chlorination methods include adding one or more additional chemicals in an attempt to kill the remaining pathogens from the water. However, these attempts are often unsuccessful and can compound the problems associated with chlorination.

Another known method of cleansing water includes impregnating water with ozone ($O_3$) to assist in killing pathogens and other microbes. Such a system is shown in FIG. 1. In these systems the water is impregnated with ozone, or "ozonated," and the ozonated water is held in a storage tank until used. Unfortunately, over a period of time the ozone ($O_3$) breaks down forming $O_2$, which does not provide the same cleansing effects as ozone. Thus, the stored ozonated water remains effectively ozonated for only a limited period of time. In addition, once the ozone breaks down and the water is no longer considered clean it is generally not used. This results in the generation of a significant amount of waste water. Furthermore, the previous ozone impregnation systems typically use an excess amount of ozone, which may come out of solution during storage of the ozonated water. This excess ozone is usually vented from the system and is neither recovered, nor recycled. Thus, a substantial external supply of ozone is required to impregnate the water, thereby resulting in higher costs and the need for a larger ozone production and storage unit.

Another drawback to previous ozonation systems is that effluent (waste) water is often introduced directly into the ozonation system without preliminary cleansing or filtration. In this case, the ozone is performing more than just the sterilization of the water; it is also cleansing the water. Consequently, the use of such effluent water requires very large quantities of ozone in order to sufficiently clean and maintain a minimum concentration of ozone in the water. Furthermore, the higher the quality of the water introduced into the ozonation system, the higher the quantity of residual ozone remaining in the water. Therefore, the amount of residual ozone in water is greatly reduced in ozonation systems using effluent water because the ozone is being used, not only to sterilize the water but also, to remove all contaminants and minerals. In addition, some of these previous ozonation systems utilize the same tank both for storing the ozonated water and for introducing the effluent water to the ozonation system, thereby quickly contaminating the ozonated water and further reducing the already decreasing ozone level. Thus, the use of effluent water in the previous ozonation systems presents many problems in the sterilization and cleansing of water.

With respect to the demineralization of the water, a common method of removing minerals from the water involves the use of a water softener. Such water softeners remove minerals, such as iron and calcium, but are not capable of sufficiently removing pathogens and other microbes from water.

Therefore, a need remains for a water sterilization system that provides purified water that is free of microbes and other pathogens.

SUMMARY OF THE INVENTION

The present invention provides an ozone purification system for fluids that includes a pump having an inlet for receiving the fluid. The pump includes at least one opening. An expansion tank is in fluid communication with a first of the at least one opening of the pump, wherein the fluid may flow from the pump through the at least one opening to the expansion tank. The system includes an ozone generator having an ozone impregnator. The impregnator is in fluid communication with the expansion tank and is adapted to inject an amount of ozone into the fluid. A holding tank is in fluid communication with the pump. A valve is in communication with the pump and includes a first and a second position. The valve directs the fluid to exit the system when the valve is in the first position, and the valve recycles the fluid to the expansion tank when the valve is in the second position.

The present invention also provides a method of cleansing a wound including the step of irrigating the wound with ozonated water produced by the system described above.

The present invention further provides a method of processing a food product including the steps of washing the ingredients of the food product with ozonated water produced by the system described above.

The present invention also provides a method of converting rew water to sterilized water, including the steps of:

(a) preliminarily purifying the raw water to produce clean water;

(b) pumping the clean water into an expansion tank;

(c) passing the clean water from the expansion tank to an ozone impregnator;

(d) impregnating the clean water with ozone using the ozone impregnator to produce ozonated water;

(e) transferring the ozonated water into a holding tank;

(f) pumping the ozonated water back to the expansion tank; and (g) repeating steps (d)-(f) to produce sterilized water and maintain its efficacy.

The present invention further provides an apparatus for sterilizing a food or beverage. The apparatus includes a generator generating a sterilizing agent; a venturi tube hanging a wall defining a passageway adapted to permit a flow of the food or beverage; and a plurality of injector tubes. Each of the injector tubes has a dispensing end, a connecting end, and a channel extending from the dispensing end to the connecting end. The channel is in communication with the passageway through the dispensing end. The connecting end is coupled to the sterilizing agent generator such that the channel receives the sterilizing agent.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 10 is a perspective view of one embodiment of a nozzle in accordance with the present invention; and FIG. 11 is a front view of the nozzle of FIG. 10.

Figure 1:
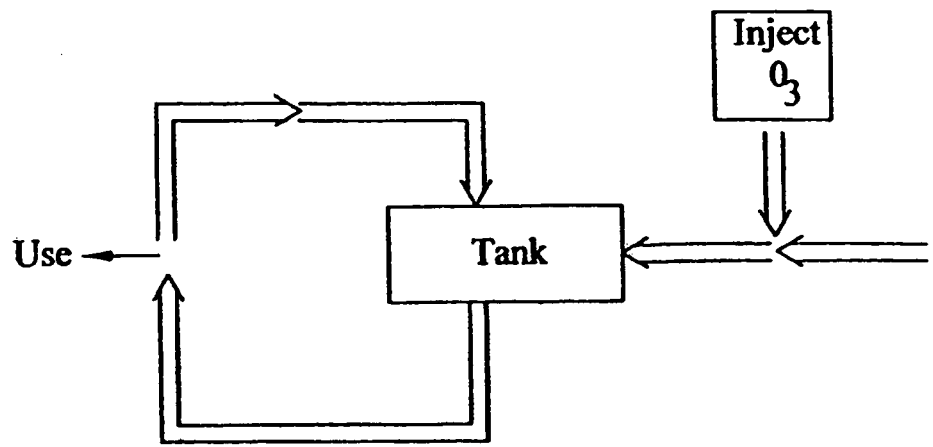
FIG. 1 is a block schematic diagram of a previous single pass ozonation system.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplification is not to be construed as limiting the scope of the invention in any manner.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended.

Figure 2:
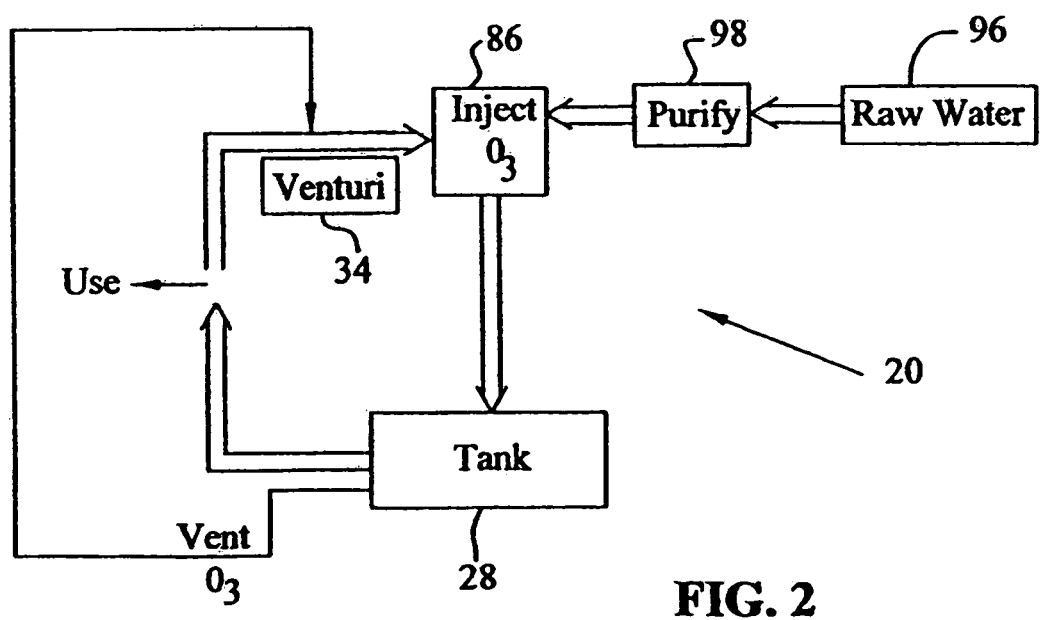
FIG. 2 is a block schematic diagram of the basic operation of the ozone sterilization system for water, in accordance with the present invention.
Figure 7:
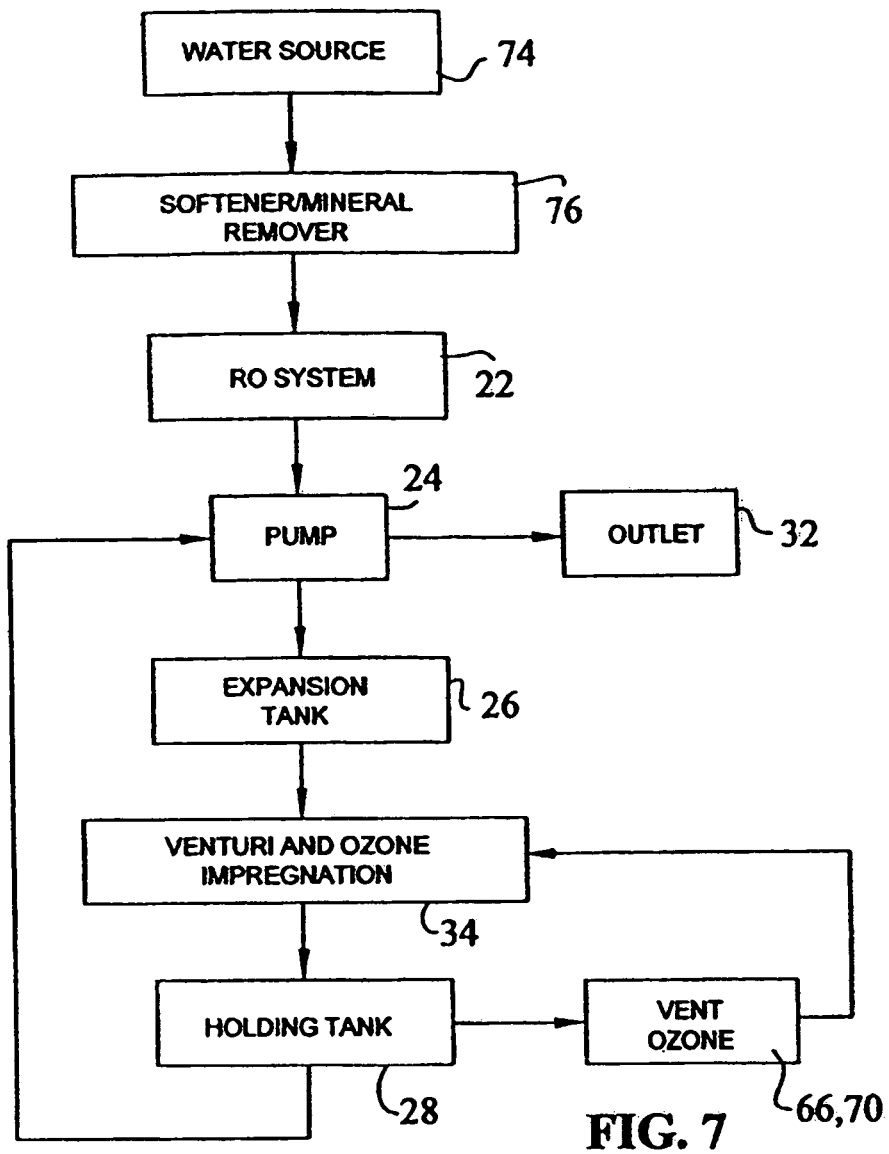
FIG. 7 is a block schematic diagram of the ozone sterilization system of FIG. 3.
Figure 9:
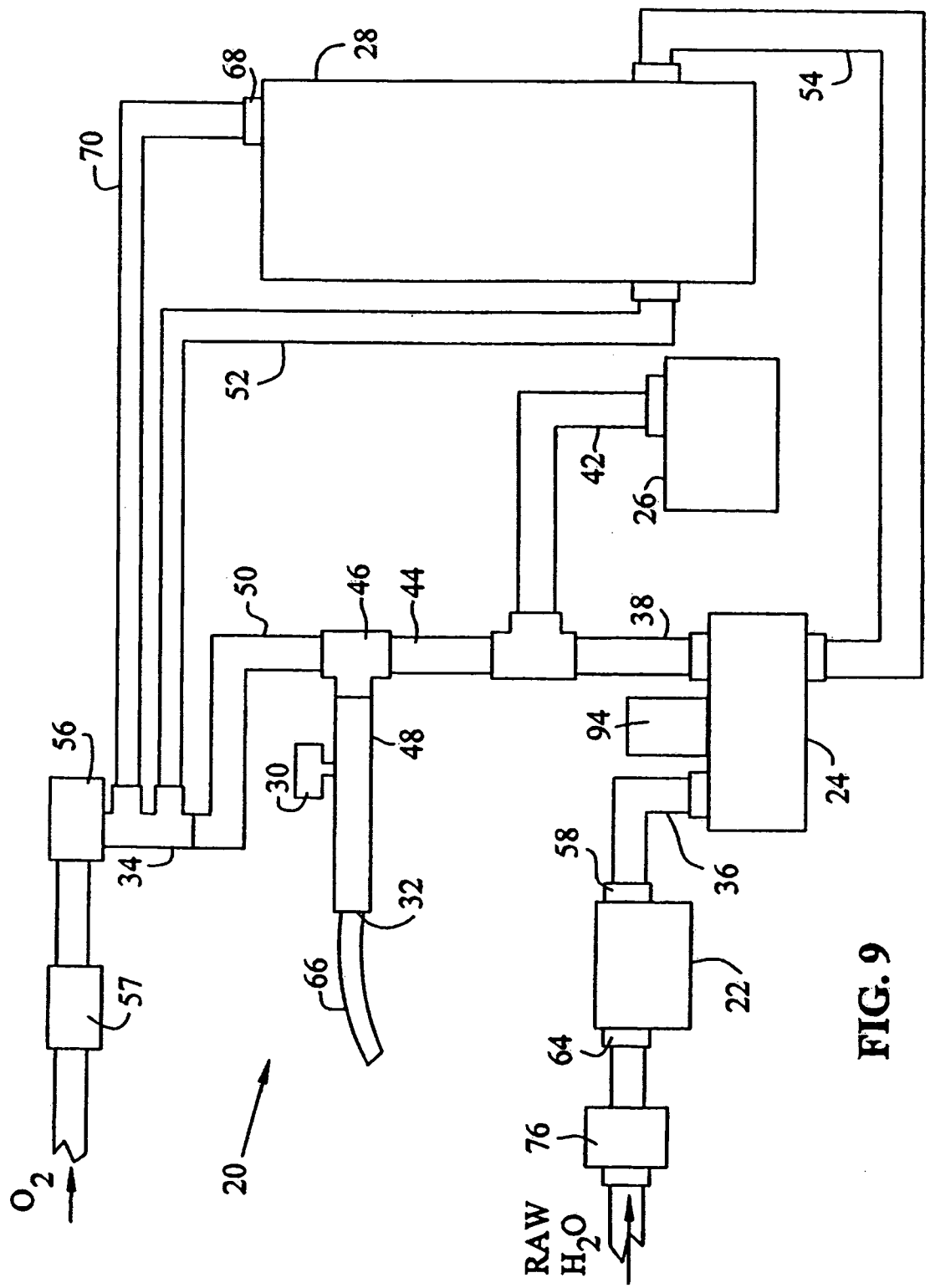
FIG. 9 is a schematic block diagram of the ozone sterilization system in FIG. 3.

As shown schematically in FIG. 2, the basic operation of ozone purification system 20 begins with receiving raw water 96, such as city water, well water, or even effluent (waste) water. Raw water 96 then undergoes a cleaning process 98, which may include demineralization and filtration by a softener 76 (FIGS. 7 and 9) and/or filtration by a reverse osmosis system 22 (FIGS. 7 and 9). Cleaning process 98 may also include distillation processes, deionization processes, or other purification processes. Since the water is cleaned prior to ozonation, the system of the present invention requires less ozone than systems that directly receive raw water. In addition, the inclusion of cleaning process 98 allows the use of effluent water, while maintaining a rate of ozone injection and retention similar to those ozonation systems utilizing demineralized or clean water.

After cleaning process 98, the cleansed water is injected with ozone 86 and the resulting ozonated water is then sent to holding tank 28. Holding tank 28 may be any known holding tank, such as those manufactured by Wellmate Water Systems, a division of the Pentair Pump Group of Chardon, Ohio. As illustrated in FIG. 2, while awaiting use, the ozonated water in tank 28 is continuously recycled and re-injected with ozone by venturi 34 to maintain a high level of ozone in the water stored in tank 28. Consequently, unlike prior systems, the water in holding tank 28 maintains a greater level of ozonation, due to the recycling and re-injection. Ozone that comes out of the water solution in tank 28 is vented from tank 28 and recycled back to venturi 34 for re-injection into the water. Thus, ozone is not wasted and a smaller, more efficient ozone generator may be used.

Referring now to FIGS. 3-6 and 9, ozone purification system 20, generally, includes reverse osmosis system 22, pump 24 connected to reverse osmosis system 22, expansion tank 26 connected to pump 24, ozone impregnator/venturi 34 connected to pump 24, ozone generator 56 connected to venturi 34, and holding tank 28 connected to venturi 34 and pump 24.

Figure 4:
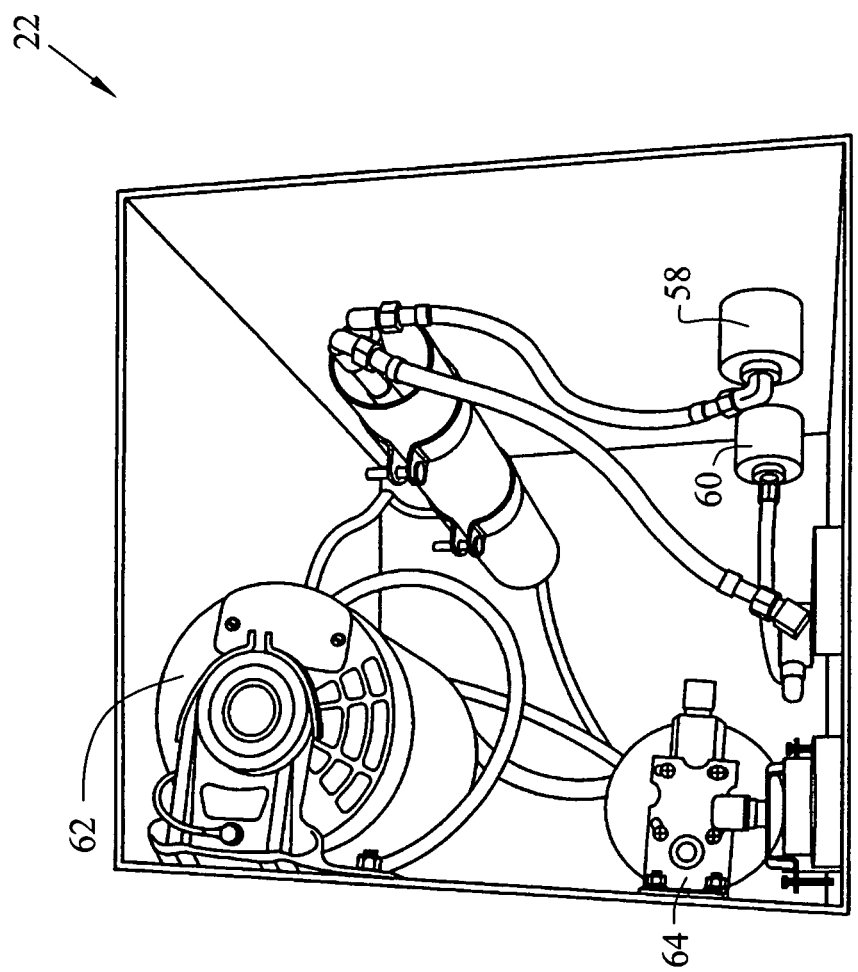
FIG. 4 is a top perspective view of the reverse osmosis system of the ozone sterilization system of FIG. 3.

Referring specifically to FIG. 4, reverse osmosis system 22 includes inlet 64 through which water from a water source (not shown) enters system 22. The water source may be a well, a municipal water system, or other raw water source. Alternatively, the water source may be from a softener and/or mineral remover, which provides demineralized water. Inlet 64 is connected to filter 62 wherein the reverse osmosis action occurs and the water is filtered. Reverse osmosis system 22 also includes outlets 58 and 60 through which the filtered water exits system 22. Outlet 60 may be coupled to a monitor (not shown) that senses the quality of the filtered water and recycles the reverse osmosis concentrate. As illustrated in FIGS. 4 and 9, outlet 58 is connected to pump 24 via inlet pipe 36. Reverse osmosis system 22 may be of any known design, such as, for example, the Comro line of reverse osmosis systems manufactured by Force Filtration Systems, Inc. of Venice, Fla.

Although reverse osmosis system 22 is shown as part of purification system 20, it should be noted that a reverse osmosis system is not required for operation of system 20. Alternative methods of, and systems for, cleansing the raw water may be utilized in place of reverse osmosis system 22, provided that the water is purified to a significantly clean level. For example, a separate ozone based water cleaning system could be used as the cleaning system for supplying sufficiently clean water to purification system 20. Distillation systems and/or demineralization systems may also be used.

Figure 3:
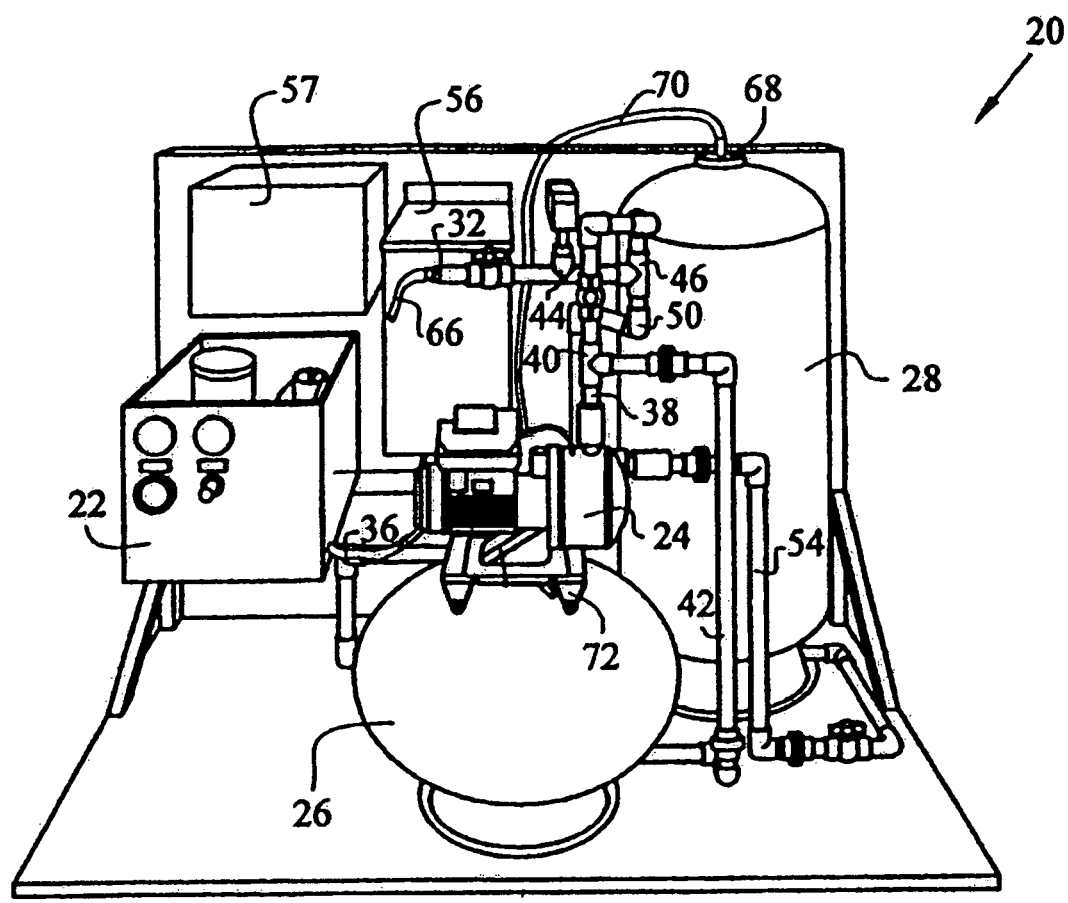
FIG. 3 a front perspective view of an embodiment of the ozone sterilization system for water utilizing the basic structure of FIG. 2.
Figure 5:
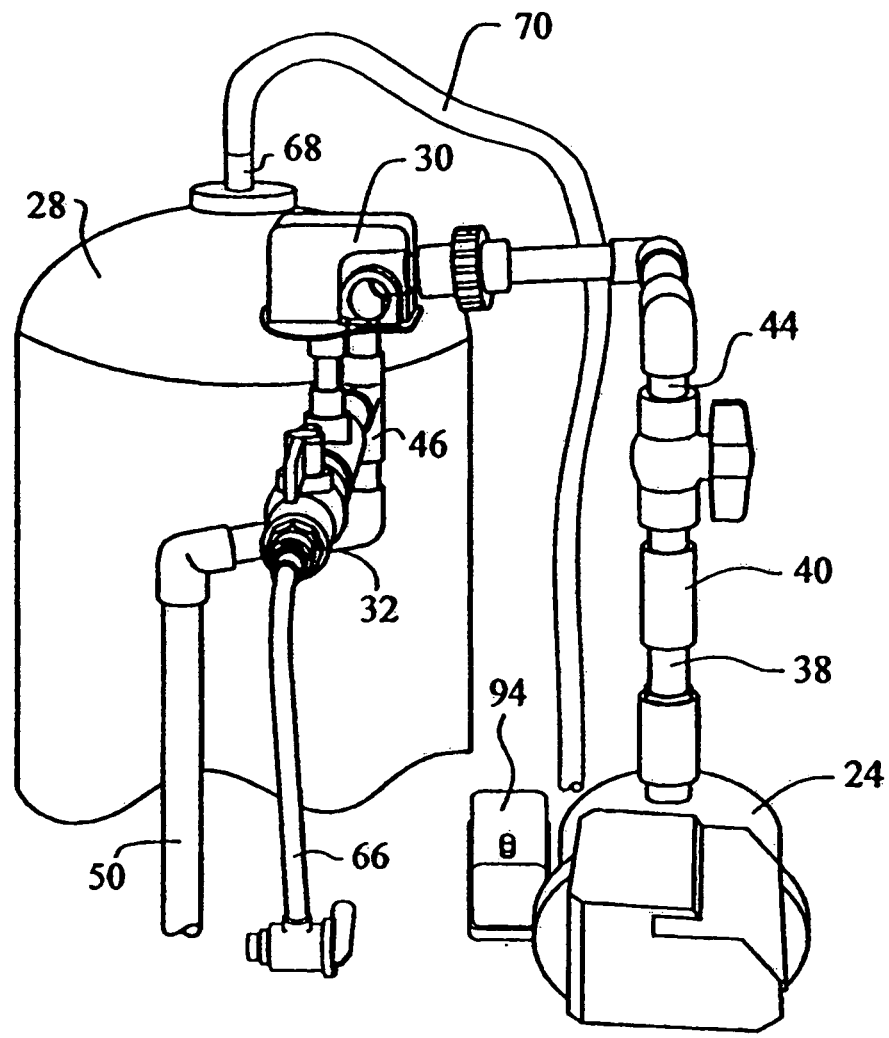
FIG. 5 is an enlarged fragmentary view of a tap and tee of the ozone sterilization system of FIG. 3.
Figure 6:
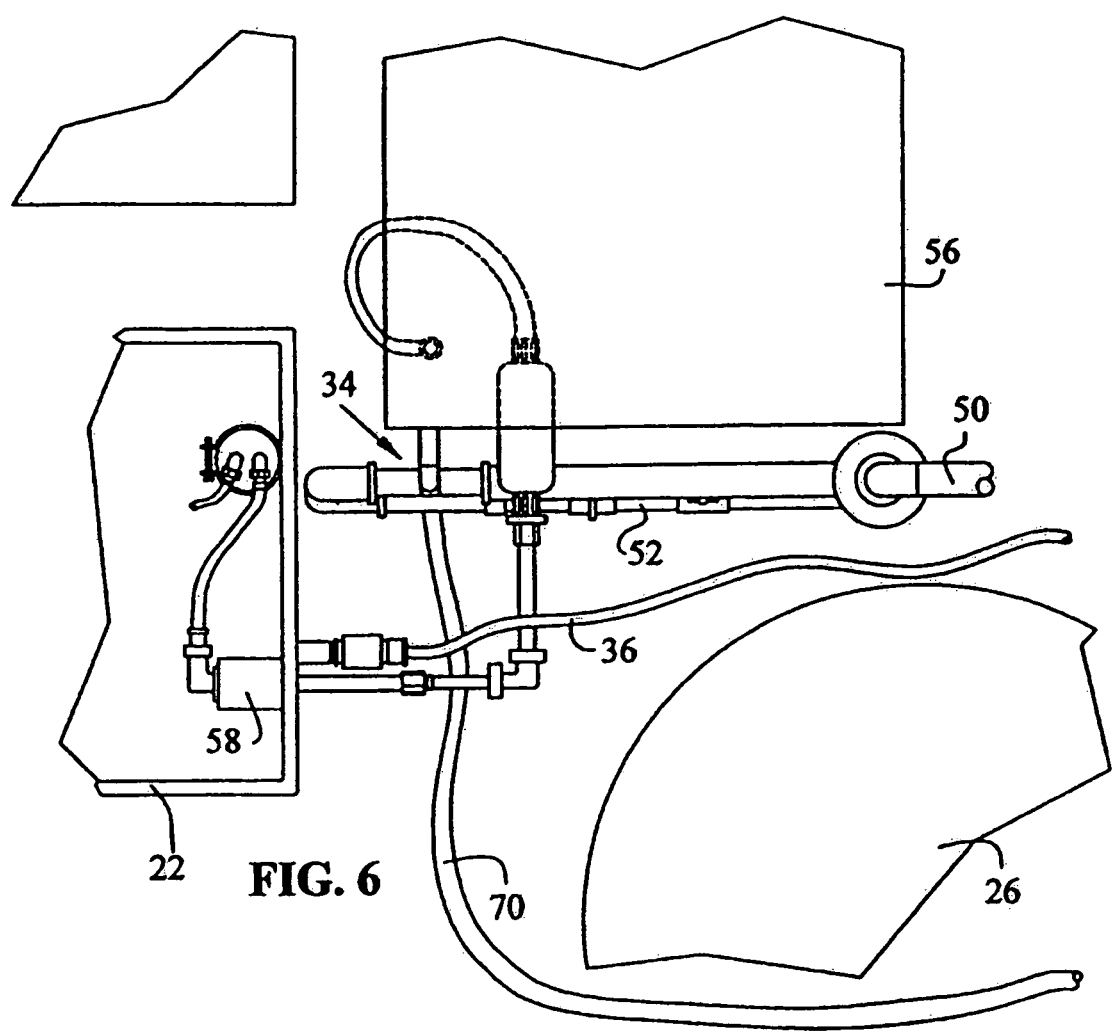
FIG. 6 is an enlarged fragmentary top view of the ozone sterilization system of FIG. 3.

Referring now to FIGS. 3, 6 and 9, outlet 58 of reverse osmosis system 22 is connected to pump 24 via inlet pipe 36. Pump 24 may be of a known type, such as those manufactured by Grundfos Management A/S of Bjerringbro, Denmark. Pump 24 includes a first opening and a second opening. The first opening of pump 24 is connected via two-way pipe 38 to tee 40. Tee 40 is connected to expansion tank 26 via two-way pipe 42. Expansion tank 26 may also be of a known type, such as those manufactured by Wellmate Water Systems, a division of the Pentair Pump Group of Chardon, Ohio. Expansion tank 26 is attached to and supports pump 24 by brackets 72. Expansion tank 26 is connected to venturi 34 via pipe 42, tee 40, pipe 44, tee 46, and pipe 50. As shown in FIGS. 5 and 9, a pressure switch, or pressure sensor, 94 is attached to pump 24 and monitors the pressure within the system.

Turning specifically to FIGS. 6 and 9, venturi 34 may include, or may be connected to an ozone sensor (not separately shown), which monitors the ozone level of the water. Venturi 34 is connected to ozone generator 56, which may be a conventional type such as, for example, those manufactured by Ozotech of Yreka, Calif. Ozone generator 56 is connected to dryer 57, which may be any known dryer including those manufactured by the Ozone Division of Net Systems Inc. of Japan. Venturi 34 is also connected to holding tank 28 via pipe 52 and via tube 70. Holding tank 28 includes vent 68, which communicates between tank 28 and tube 70. Holding tank 28 is also connected to pump 24 via pipe 54. Referring to FIGS. 5 and 9, tap 32 is connected to tee 46 via pipe 48 such that there is a direct connection between pump 24 and outlet 32 via pipe 38, tee 40, pipe 44, tee 46 and pipe 48. Tap 32 is connected to outlet tube 66, which may be used to facilitate the drawing of the ozonated water from system 20. Pressure switch 30 is linked to pipe 48 and monitors the pressure within pipe 48, tap 32 and outlet tube 66. Pressure switch 30 is coupled to a valve (associated with pump 24) that moves between a first position and a second position to direct the flow of water, as is described in further detail below. The valve may be connected to, or a component of, pump 24.

Referring to FIGS. 7 and 9, the operation of system 20 will now be described in further detail. First, raw (unpurified) water from water source 74 passes through softener 76 where minerals are filtered from the water. The demineralized water then enters reverse osmosis system 22 through inlet 64, where the water is further filtered and demineralized. The filtered, but unsterilized water, exits reverse osmosis system 22 through outlet 58 and flows through inlet pipe 36 to pump 24. Pump 24 then pumps the unsterilized water to expansion tank 26 via pipe 38, tee 40 and pipe 42.

In the meantime, sensor 94 is monitoring the pressure within the system. When the system pressure indicates that the water level (pressure) within expansion tank 26 has reached or exceeded a predetermined level and that holding tank 28 is not full, sensor 94 permits the unsterilized water to flow from expansion tank 26 to venturi 34. In flowing from expansion tank 26 to venturi 34, the unsterilized water travels through pipe 42, tee 40, pipe 44, tee 46 and pipe 50.

Meanwhile, oxygen ($O_2$) enters dryer 57 where it is dried in preparation for conversion to ozone ($O_3$). The dried oxygen ($O_2$) flows to ozone generator 56, which produces ozone ($O_3$) from the dried oxygen ($O_2$). The amount of ozone generated may be adjusted according to the amount of ozone sensed in the water. The ozone is then passed to venturi 34, which injects the unsterilized water with the ozone to produce ozonated (sterile) water. The ozonated water then flows from venturi 34 to holding tank 38 via pipe 52. The ozonated water is drawn from holding tank 28 back to pump 24 via pipe 54, and is either recirculated to venturi 34 for super-impregnation of ozone, or released to tap 32.

Meanwhile, pressure sensor 30 monitors the pressure within pipe 48, tap 32, and outlet tube 66. When the pressure indicates that a demand has been made for ozonated water, pressure sensor 30 triggers the valve to move to the first position, which allows the ozonated water to flow from pump 24 through pipe 38, tee 40, pipe 44, tee 46, pipe 48, tap 32 and out outlet tube 66. If no demand has been made, pressure sensor 30 triggers the valve to move to the second position, which restricts flow to outlet tube 66. In this case, the ozonated water recirculates through pipe 38, tee 40, pipe 42 to expansion tank 26. From expansion tank 26 the ozonated water returns to venturi 34 via tube 42, tee 40, tube 44, tee 46 and tube 50 for reimpregnation or superimpregnation with ozone. The resulting super-ozonated water returns to holding tank 28 via pipe 52. This cycling and superimpregnation of the water occurs periodically or continuously until water demand is sensed by pressure switch 30. This recycling results in water having and maintaining high levels of ozone. The highly purified water, which has undergone the ozone impregnation process, is capable of being used in any application requiring clean and sterilized water.

While stored in holding tank 28, excess ozone may come out of the ozonated water solution. In this event, the excess ozone is vented through vent 68 and flows through tube 70 to venturi 34. The excess ozone then is used to ozonate water, rather than being vented to the ambient air surrounding ozone sterilization system 20. This recycling of ozone minimizes the waste of ozone and allows for the use of a smaller, more efficient ozone generator.

Figure 8:
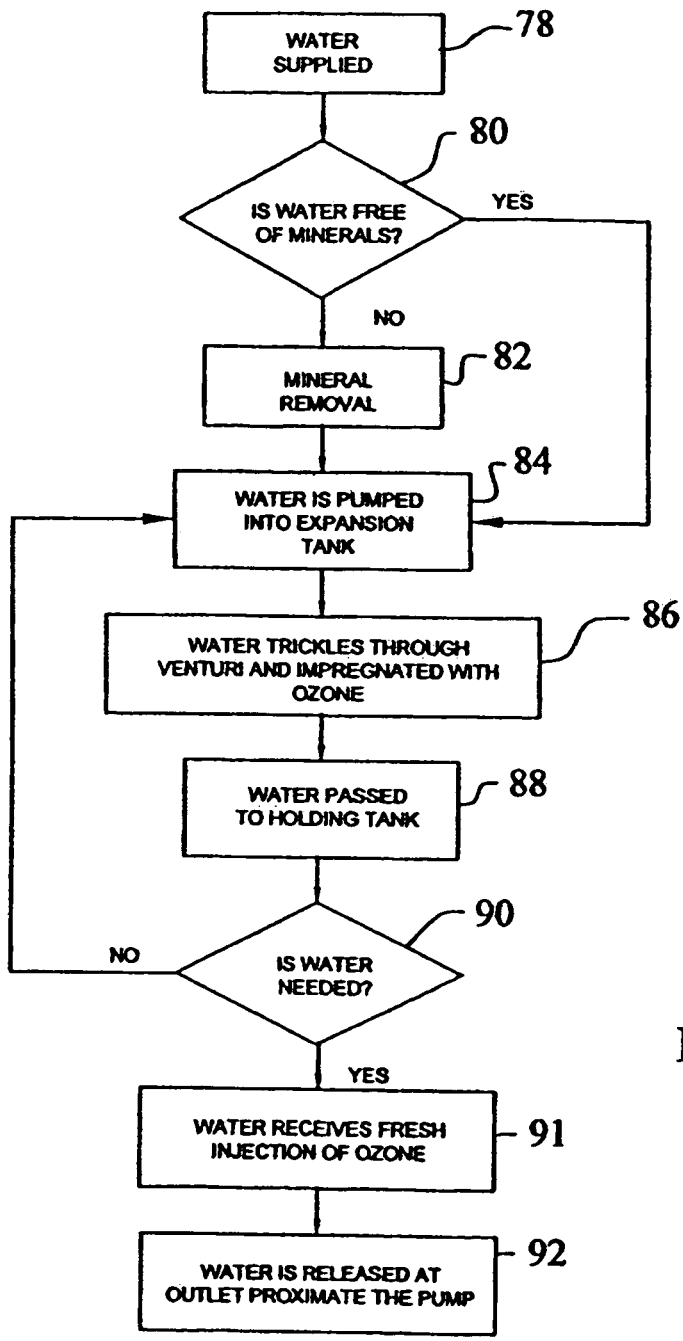
FIG. 8 is a flowchart showing the operative steps in the ozone sterilization system in accordance with the present invention.

The operation of an ozone purification system according to another embodiment will now be described with reference to the schematic diagram in FIG. 8. At block 78, water is supplied to system from a water source. Next, a determination is made as to whether or not the water has already been demineralized (block 80). If the water has not been demineralized, then the water passes through a mineral removal process (block 82), which may be performed by a softener, a reverse osmosis system, and/or other demineralization mechanism. If the water is free of minerals, then the water is pumped into an expansion tank (block 84). After passing into the expansion tank, the water passes through a venturi where the water is impregnated with ozone (block 86). The resulting ozonated water is then passed to a holding tank 28 (block 88).

After the water is passed to the holding tank, the system determines whether ozonated water has been demanded at the tap. If ozonated water has been demanded, then the water is released, as described above and indicated at block 92. Just prior to the release of water, the water receives a fresh injection of ozone (block 91). If ozonated water is not demanded at the tap, the ozonated water is pumped back into the expansion tank (block 84) and then trickles through the venturi, where it is again impregnated with ozone (block 86). The water is again passed to the holding tank (block 88), and the cycle is repeated. Thus, the water circulating through the system is impregnated with ozone multiple times, thereby creating super-impregnated water and maintaining a predetermined concentration of ozone in the water.

As noted above, the highly purified water produced by systems of this invention, is capable of being used in any application requiring clean and/or sterilized water. For instance, the purified water produced by systems of this invention may be used for human or animal consumption. The highly purified water may be used medicinally to cleanse wounds, equipment, or supplies. The water may also be used in food processing to clean the equipment or ingredients. It may also be used as an ingredient or supplement in food or beverage processing.

Referring now to FIGS. 10 and 11, when used in food processing and other applications, system 20 may include venturi tube 110. Venturi tube 110 serves to inject ozone or other sterilization agent into a fluid stream to produce a purified fluid stream, creating an ozonated fluid. Venturi tube 110 includes substantially cylindrical wall 112, which defines passageway 114. A plurality of injector tubes 116 extend through wall 112 and into passageway 114. Each injector tube 116 includes dispensing end 118, connecting end 120, and channel 122 extending from dispensing end 118 to connecting end 120. Dispensing end 118 protrudes into passageway 114 and connecting end 120 connects to a sterilizing agent generator, such as ozone generator 56 (FIG. 3), such that passageway 114 is in communication with a sterilizing agent generator through channel 122. A check valve 124 may be positioned in channel 122 at connecting end 120 to control the flow of ozone into passageway 114 and prevent flow from entering ozone generator 56. The ends 126 of venturi tube 110 may be threaded for connection to other food processing components and equipment.

In operation, the food or beverage flows down passageway 114 of venturi tube 110 in the direction of the arrow. As the food or beverage flows pass dispensing end 118 of injector tubes 116, a sterilizing agent is injected into the food or beverage. The sterilizing agent may be ozone. Alternatively, the food or beverage may be injected with ozonated water from ozone purification system 20, in which case connecting end 120 of injector tubes 116 are connected to outlet 66 of ozone purification system 20 (FIG. 2). In another alternative, the food or beverage may be injected with hydrogen peroxide, in which case connecting end 120 of injector tubes 116 is connected to a source of hydrogen peroxide.

Although venturi tube 110 is shown as having a substantially cylindrical shape, it should be understood that the venturi tube of the present invention may have a variety of different shapes and designs. In addition, venturi tube 110 may vary in size depending on the application in which the water is used. For example, in processing foods such as salsa, sauces or other like foods, passageway 114 of nozzle 110 may have a diameter of about 1¼ inch (3.175 cm) to about 1½ inch (3.81 cm). In addition, injector tubes 116 are positioned at an angle α of between about 45° to about 75°, and preferably at about 65° relative to axis A of venturi tube 110. This positioning of injector tubes 116 minimizes the disruption in the food processing, because the ozone or ozonated water is injected quickly and in the direction of the flow of the food. Thus the flow of the food is not significantly reduced or blocked by the ozone or ozonated water entering passageway 114 from dispensing end 118 of injector tubes 116.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for sterilizing a fluid, said apparatus comprising:
   an injector adapted to inject an ozone containing fluid into the fluid, said injector including a venturi tube having a wall defining a passageway, said passageway adapted to receive a flow of the fluid; said injector further including at least one hollow injector tube extending through said wall of said venturi tube, each of said at least one injector tubes having a dispensing end positioned within said passageway, a connecting end positioned outside of said wall, and a channel extending from said dispensing end to said connecting end, said channel in communication with said passageway through said dispensing end, said connecting end adapted to receive said ozone containing fluid and communicate said ozone containing fluid to said passageway;
   wherein said apparatus further comprises a sterilizing agent generator adapted to generate said ozone containing fluid, said connecting end of each of said plurality of injector tubes being coupled to said sterilizing agent generator to receive said ozone containing fluid; and
   wherein said sterilizing agent generator is an ozone purification system and said ozone containing fluid is ozonated water.

2. The apparatus of claim 1 wherein said passageway defines an axis and wherein each of said plurality of injector tubes are positioned at an angle of between about 45° to about 75° to said axis of said passageway.

3. The apparatus of claim 1 wherein at least one injector tube includes a plurality of injector tubes spaced apart from one another about said wall of said venturi tube.

4. The apparatus of claim 1 wherein said ozone purification system includes
   a pump having an inlet for receiving unsterilized water, said pump including at least one opening;
   an expansion tank in fluid communication with said pump and receiving unsterilized water though a first of said at least one openings;
   an ozone generator having an ozone impregnator, said impregnator in fluid communication with said expansion tank and adapted to inject an amount of ozone into the unsterilized water to produce ozonated water;
   a holding tank in fluid communication with said ozone impregnator to receive said ozonated water, said holding tank in fluid communication with said pump through a second of said at least one openings; and
   a valve in communication with said pump, said valve having a first and a second position, said valve directing the ozonated water from said holding tank to said connector end of said injector tubes when said valve is in said first position, and said valve recycling the ozonated water from said holding tank to said expansion tank for recycling to said ozone impregnator when said valve is in said second position.

5. A fluid purification system comprising a
   a pump having an inlet for receiving unsterilized fluid, said pump including at least one opening;
   an expansion tank in fluid communication with said pump and receiving unsterilized fluid though a first of said at least one openings;
   an ozone generator;
   ozone injector including a venturi tube having a wall defining a passageway, said passageway being in fluid communication with said expansion tank to receive a flow of the unsterilized fluid; said injector further including a plurality of hollow injector tubes extending through said wall of said venturi tube, each of said plurality of injector tubes having a dispensing end extending into said passageway, a connecting end positioned outside of said passageway, and a channel extending from said dispensing end to said connecting end, said channel being in communication with said passageway through said dispensing end, said connecting end coupling to said ozone generator to receive ozone from said ozone generator and communicate said ozone to the fluid in said passageway;

a holding tank in fluid communication with said ozone injector to receive said ozonated fluid, said holding tank in fluid communication with said pump through a second of said at least one openings; and a valve in communication with said pump, said valve having a first and a second position, said valve directing the ozonated fluid from said holding tank to said connector end of said injector tubes when said valve is in said first position, and said valve recycling the ozonated fluid from said holding tank to said expansion tank for recycling to said ozone injector when said valve is in said second position.

6. The fluid purification system of claim 5 wherein said passageway defines an axis and wherein each of said at least one injector tubes is positioned at an angle of between about 45° to about 75° to said axis of said passageway.

7. The fluid purification system of claim 5 further comprising a check valve disposed within said channel proximal said connecting end.

8. A method of manufacturing an apparatus for sterilizing a fluid, the method comprising the steps of:
 developing an injector adapted to inject a first fluid into the fluid by:
  forming a venturi tube having a wall defining a passageway and an axis;
  drilling at least one hole through the wall of the venturi tube; and
  inserting a hollow injector tube through each of the at least one holes at an angle of between about 45° to about 75° to the axis of the venturi tube, such that a dispensing end of the injector tube is positioned within the passageway and a connecting end is positioned outside of the passageway, and coupling an inlet end of the venturi tube to an expansion tank to receive unsterilized fluid.

9. The method of claim 8 further comprising the step of coupling the connecting end of the injector tube to a generating apparatus adapted to generate the first fluid.

10. The method of claim 9 wherein the first fluid comprises ozone and the generating apparatus is an ozone generator.

11. The method of claim 8 further comprising the step of coupling an outlet end of the venturi tube to a holding tank.

12. The method of claim 8 wherein said step of drilling at least one hole includes drilling a plurality of holes spaced apart from one another about the wall of the venturi tube.

13. The method of claim 8 wherein said step of drilling at least one hole includes drilling the at least one hole at angle of between about 45° to about 75° to the axis of the venturi tube.

* * * * *